(12) United States Patent
Choe et al.

(10) Patent No.: US 12,430,373 B2
(45) Date of Patent: Sep. 30, 2025

(54) METHOD, COMPUTER DEVICE, AND NON-TRANSITORY COMPUTER-READABLE RECORDING MEDIUM TO PROVIDE SEARCH RESULTS BASED ON MULTI-MODAL FEATURES

(71) Applicant: NAVER CORPORATION, Seongnam-si (KR)

(72) Inventors: Seungkwon Choe, Seongnam-si (KR); Jieun Lee, Seongnam-si (KR); Sangyeon Kim, Seongnam-si (KR); Dongju Lee, Seongnam-si (KR); Jisu Jeon, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 18/529,588

(22) Filed: Dec. 5, 2023

(65) Prior Publication Data
US 2024/0193197 A1    Jun. 13, 2024

(30) Foreign Application Priority Data

Dec. 13, 2022 (KR) .................. 10-2022-0174089
Mar. 31, 2023 (KR) .................. 10-2023-0043095

(51) Int. Cl.
*G06F 16/33* (2025.01)
*G06F 16/334* (2025.01)

(52) U.S. Cl.
CPC ............... *G06F 16/3347* (2019.01)

(58) Field of Classification Search
CPC .................................. G06F 16/3347
See application file for complete search history.

(56) References Cited

U.S. PATENT DOCUMENTS

| | | | |
|---|---|---|---|
| 2001/0025232 A1* | 9/2001 | Klimasauskas | G05B 13/027 703/13 |
| 2012/0233183 A1* | 9/2012 | Nakahashi | G06Q 30/02 707/749 |
| 2020/0104318 A1 | 4/2020 | Ponjou Tasse et al. | |
| 2020/0104380 A1* | 4/2020 | Connell, II | G06N 20/00 |
| 2020/0380027 A1* | 12/2020 | Aggarwal | G06F 16/538 |
| 2020/0380403 A1* | 12/2020 | Aggarwal | G06V 10/945 |
| 2021/0176181 A1* | 6/2021 | Arora | H04L 41/16 |
| 2022/0121702 A1* | 4/2022 | Kale | G06N 3/04 |
| 2022/0292333 A1 | 9/2022 | Zeiler et al. | |

(Continued)

FOREIGN PATENT DOCUMENTS

| | | |
|---|---|---|
| JP | 2017152042 A | 8/2017 |
| KR | 1020040079604 A | 9/2004 |

OTHER PUBLICATIONS

EP Search Report issued in corresponding European patent application No. 23216031, dated Apr. 23, 2024.

(Continued)

*Primary Examiner* — Mohammad S Rostami
(74) *Attorney, Agent, or Firm* — Greer Burns & Crain Ltd.

(57) ABSTRACT

A method of providing search results based on multi-modal features includes performing a vector operation between attributes according to a user query on a multi-modal embedding space; and providing search results corresponding to the user query based on an embedding vector acquired through the vector operation.

10 Claims, 15 Drawing Sheets

(56) References Cited

U.S. PATENT DOCUMENTS

| | | | |
|---|---|---|---|
| 2023/0185874 A1* | 6/2023 | Gokmen | G06F 17/16 |
| | | | 708/607 |
| 2023/0237093 A1* | 7/2023 | Li | H04N 21/4668 |
| | | | 707/734 |
| 2023/0244325 A1* | 8/2023 | Humphreys | G06N 3/0475 |
| | | | 345/157 |
| 2023/0306087 A1* | 9/2023 | Krishnan | G06F 16/583 |
| 2023/0325391 A1* | 10/2023 | Li | G06F 16/683 |
| | | | 707/723 |
| 2024/0037496 A1* | 2/2024 | Thirunavukkarasu | G06F 17/16 |
| 2024/0086684 A1* | 3/2024 | Kwon | G06N 3/0455 |
| 2024/0095242 A1* | 3/2024 | Miller | G06F 16/24534 |
| 2024/0119052 A1* | 4/2024 | Sun | G06F 16/953 |
| 2024/0194303 A1* | 6/2024 | Holderrieth | G16B 25/10 |
| 2024/0388220 A1* | 11/2024 | Jiang | H02M 1/0054 |

OTHER PUBLICATIONS

Office Action issued in corresponding Japanese patent application No. 2023-201168, dated Jul. 23, 2024.

\* cited by examiner

Natural language query: "rainbow old school high tops"

Natural language query: "rainbow old school high tops" - rainbow

Natural language query: "rainbow old school high tops"
- rainbow + red

METHOD, COMPUTER DEVICE, AND NON-TRANSITORY COMPUTER-READABLE RECORDING MEDIUM TO PROVIDE SEARCH RESULTS BASED ON MULTI-MODAL FEATURES

CROSS-REFERENCE TO RELATED APPLICATION(S)

This U.S. non-provisional application claims the benefit of priority under 35 U.S.C. § 119 to Korean Patent Application Nos. 10-2022-0174089 filed on Dec. 13, 2022 and 10-2023-0043095 filed on Mar. 31, 2023, in the Korean Intellectual Property Office (KIPO), the entire contents of which are incorporated herein by reference.

BACKGROUND OF THE INVENTION

Field of Invention

One or more example embodiments of the present invention in the following description relate to technology for providing search results suitable for user intent.

Description of Related Art

A search engine refers to software or a website that assists a user to easily retrieve data on the Internet. The search engine searches a database using a keyword entered from the user, extracts search results of the keyword, and provides the search results to the user.

As an example of technology for providing search results, technology for generating a list of search results for a keyword in a search engine is disclosed in Korea Patent Laid Open Publication No. 10-2004-0079604, published on Sep. 16, 2004.

BRIEF SUMMARY OF THE INVENTION

One or more example embodiments of the present invention may provide search results suitable for user intent by simultaneously understanding multi-modal input.

One or more example embodiments may efficiently search for a product with an attribute desired by a user by combining an image and text.

One or more example embodiments may search for search results through a vector operation by transforming multi-modal embedding of a product to a vector space that allows linear expression.

One or more example embodiments may provide various combinations of searches of adding or subtracting an attribute using a virtual space that allows a vector operation.

According to an aspect of at least one example embodiment, there is provided a multi-modal search method performed by a computer device, wherein the computer device includes at least one processor configured to execute computer-readable instructions included in a memory, and the multi-modal search method includes performing, by the at least one processor, a vector operation between attributes according to a user query on a multi-modal embedding space; and providing, by the at least one processor, search results corresponding to the user query based on an embedding vector acquired through the vector operation.

The performing of the vector operation may include using a correction function that considers a non-linear error of the multi-modal embedding space.

The performing of the vector operation may include estimating a correction function that considers a non-linear error of the multi-modal embedding space using each attribute vector in the multi-modal embedding space; and performing a vector operation between attributes included in the user query through an approximate computation using the correction function.

The multi-modal embedding space may be defined as a vector space decomposable into a delta space with non-linearity and a vector space that allows linear expression.

The performing of the vector operation may include transforming the multi-modal embedding space to a vector space that allows linear expression; and performing a vector operation between attributes included in the user query in the vector space.

The providing of the search results may include restoring the vector space to the multi-modal embedding space and providing at least one product having a vector within a certain distance from an embedding vector acquired through the vector operation in the multi-modal embedding space.

The performing of the vector operation may include performing a vector operation corresponding to at least one image and at least one text input as the user query.

The performing of the vector operation may include subtracting a specific attribute through a combination with a vector in a direction opposite to that of a vector corresponding to the specific attribute among attributes included in the user query.

The performing of the vector operation may include adjusting the strength of a specific attribute through scalar multiplication of a vector corresponding to the specific attribute among attributes included in the user query.

The performing of the vector operation may include performing a cross-modal feature vector manipulation between a text vector space and an image vector space using the same coordinate system.

According to an aspect of at least one example embodiment, there is provided a non-transitory computer-readable recording medium including instructions that, when executed by a processor, cause the processor to computer-implement the multi-modal search method.

According to an aspect of at least one example embodiment, there is provided a computer device including at least one processor configured to execute computer-readable instructions included in a memory, wherein the at least one processor is configured to perform a vector operation between attributes according to a user query on a multi-modal embedding space; and provide search results corresponding to the user query based on an embedding vector acquired through the vector operation.

According to some example embodiments, since it is possible to retrieve a product more suitable for user intent by simultaneously understanding a multi-modal input in which an image and text are combined, it is possible to improve search quality.

According to some example embodiments, it is possible to more quickly and easily search for desired search results through a vector operation by transforming multi-modal embedding of a product to a vector space that allows linear expression.

According to some example embodiments, it is possible to accurately reflect user intent by providing various combinations of searches of readily adding or subtracting an attribute using a virtual space that allows a vector operation.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
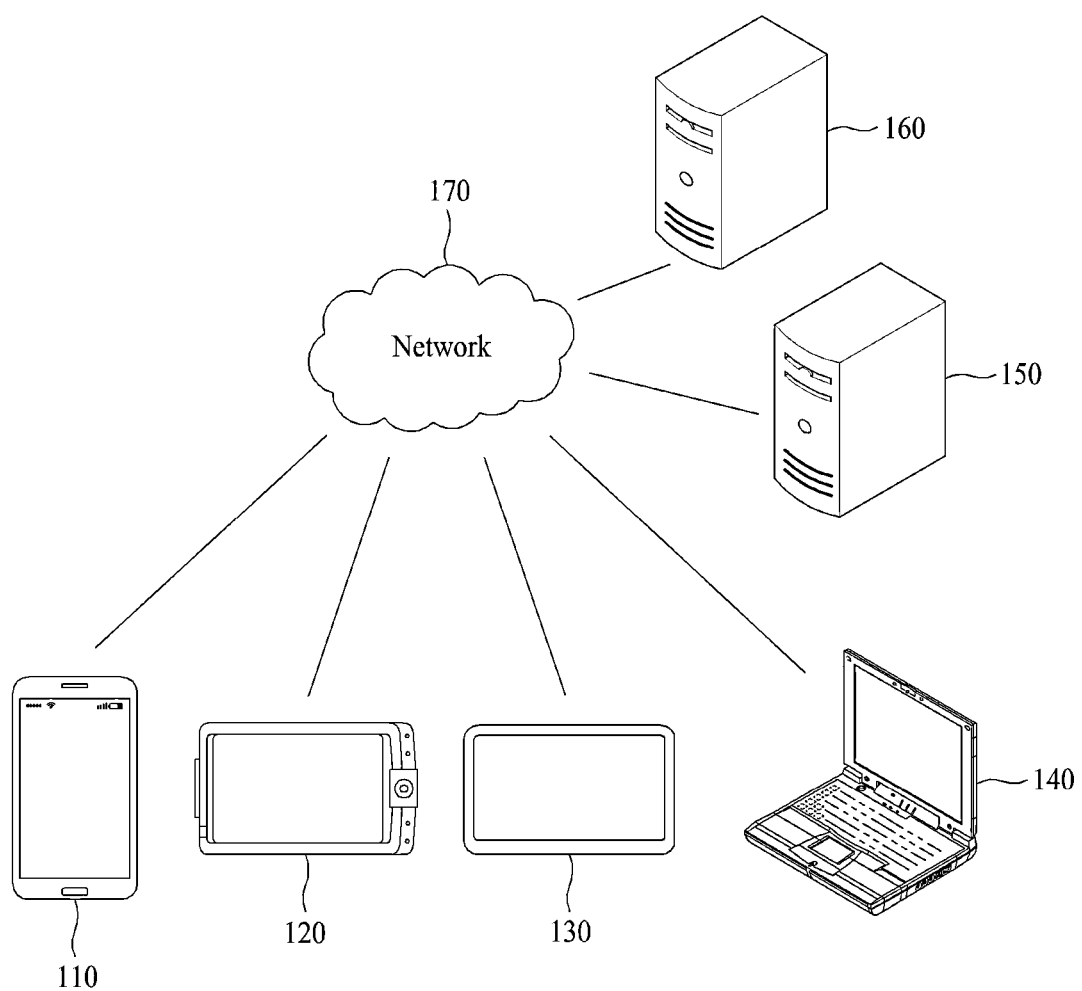
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

The example embodiments relate to technology for providing search results suitable for user intent.

The example embodiments including disclosures herein may quickly and easily retrieve a product suitable for user intent through a vector operation of readily adding or subtracting a product attribute using a virtual space in which a multi-modal embedding for the product is linearly expressed.

A product search system according to the example embodiments may be implemented by at least one computer device and a product search method according to the example embodiments may be performed by the at least one computer device included in the product search system. Here, a computer program according to an example embodiment may be installed and executed on the computer device, and the computer device may perform the product search method according to the example embodiments under the control of the executed computer program. The aforementioned computer program may be stored in a computer-readable storage medium to computer-implement the product search method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers is not limited thereto. Also, the network environment of FIG. 1 is provided as an example among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service (e.g., a product search service) to the plurality of electronic devices 110, 120, 130, and 140 connected over the network 170.

Figure 2:
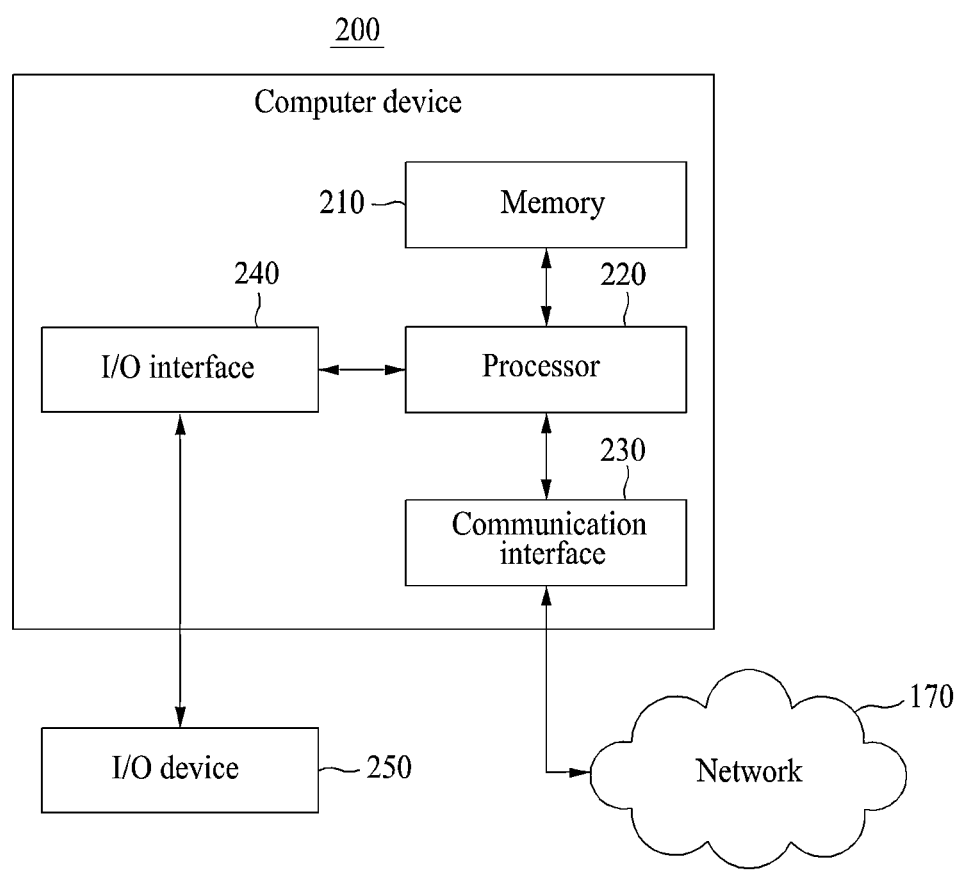
FIG. 2 is a block diagram illustrating an example of a computer device according to at least one example embodiment.

FIG. 2 is a block diagram illustrating an example of a computer device according to at least one example embodiment. Each of the plurality of electronic devices 110, 120, 130, and 140 of FIG. 1 or each of the servers 150 and 160 may be implemented by a computer device 200 of FIG. 2. For example, the product search service according to the example embodiments may be implemented by the computer system 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may be a hardware module, such as an antenna, a data bus, a network interface card, a network interface chip, and a networking interface port of the computer device 200, or a software module, such as a network device driver or a networking program, and configured to provide a function for communication between the computer device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under the control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device of the I/O device 250 may include a device, such as a microphone, a keyboard, a mouse, etc., and an output device of the I/O device 250 may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

According to other example embodiments, the computer device 200 may include greater or less number of components than the number of components shown in FIG. 2. For example, the computer device 200 may include at least a portion of the I/O device 250, or may further include other components, for example, a transceiver, a database, etc.

Hereinafter, example embodiments of a method and a device for providing search results based on multi-modal features are described in detail.

Figure 3:
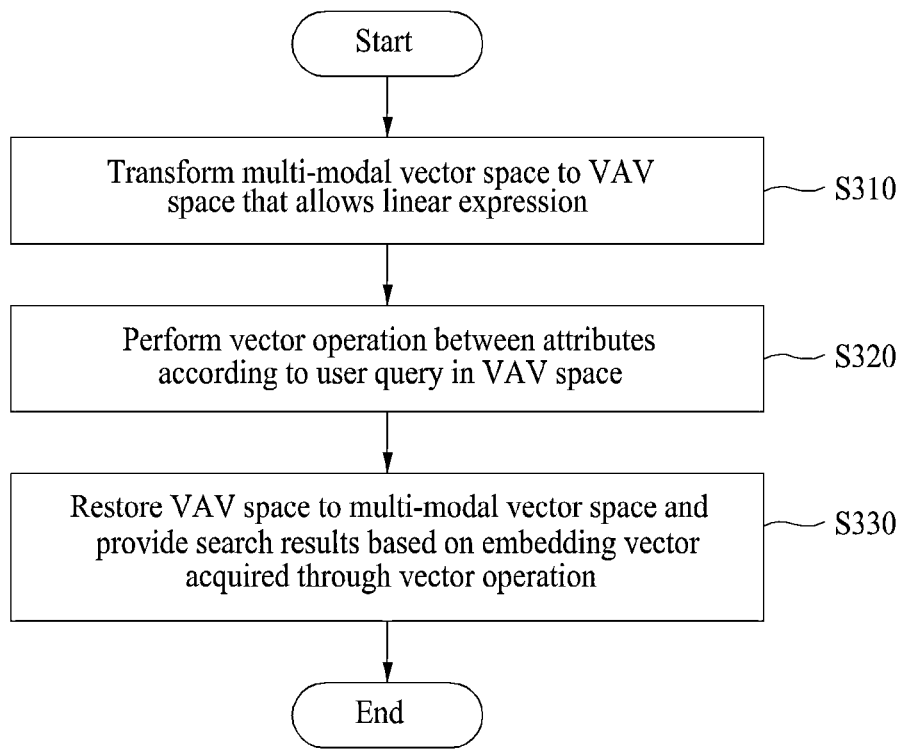
FIG. 3 is a flowchart illustrating an example of a product search method performed by a computer device according to at least one example embodiment.

FIG. 3 is a flowchart illustrating an example of a product search method performed by a computer device according to at least one example embodiment.

The product search method according to the example embodiment may be performed by the computer device 200. In this case, the processor 220 of the computer device 200 may be implemented to execute a control instruction according to a code of at least one program or a code of an OS included in the memory 210. Here, the processor 220 may control the computer device 200 to perform operations S310 to S330 included in the product search method of FIG. 3, which are stored as control instructions in a program or a code in the memory 210.

Referring to FIG. 3, in operation S310, the processor 220 may transform a vector space in which multi-modal embedding of a product is mapped (hereinafter, referred to as a "multi-modal vector space") to a vector space that allows linear expression (hereinafter, referred to as a "virtual attribute vector (VAV) space").

Figure 4:
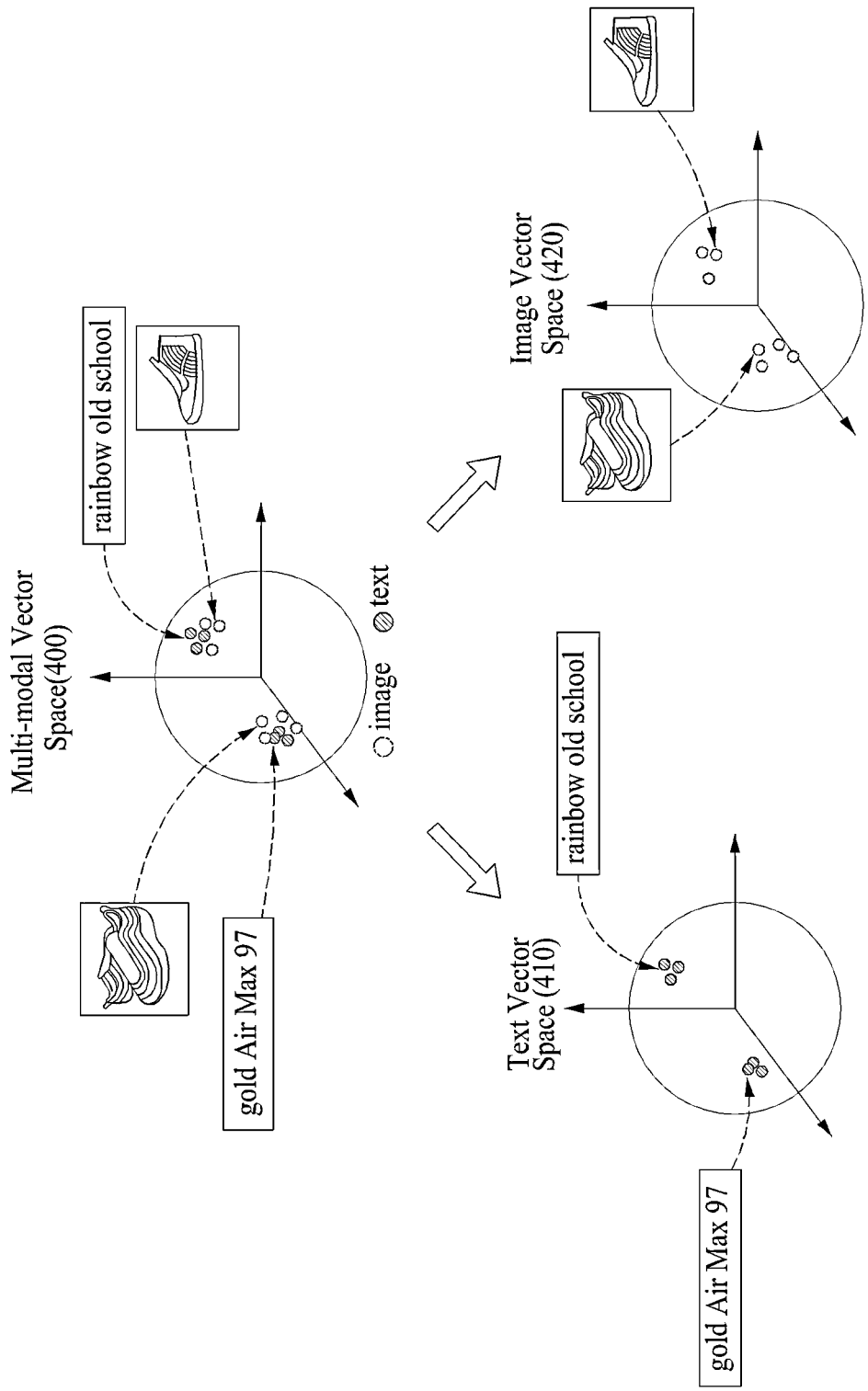
FIG. 4 is a diagram illustrating an example explaining a multi-modal vector space according to at least one example embodiment.

Referring to FIG. 4, a multi-modal vector space 400 may map images and text of the same product to the same vector space. The multi-modal vector space 400 may be decomposed into two different vector spaces having the same coordinate system, that is, a text vector space 410 and an image vector space 420.

Figure 5:
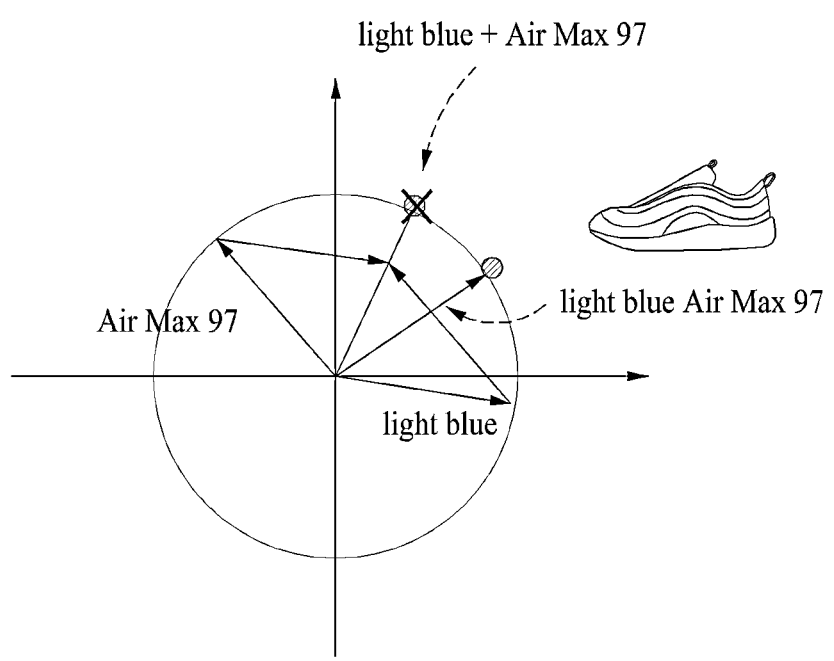
FIG. 5 is a diagram illustrating an example explaining limitation of a vector operation according to at least one example embodiment.
Figure 6:
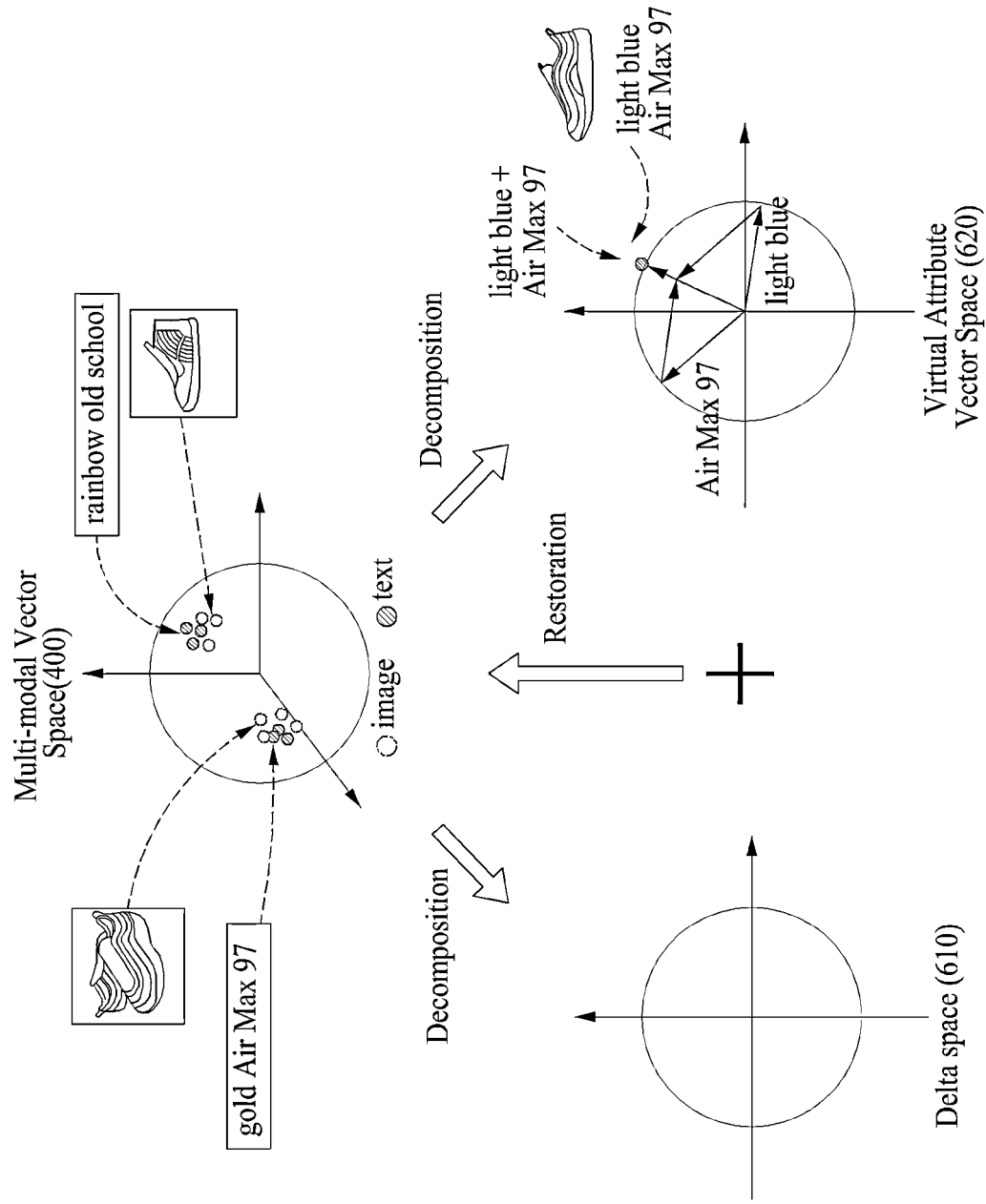
FIG. 6 is a diagram illustrating an example explaining a virtual vector space that allows a vector operation according to at least one example embodiment.

In general, since non-linearity is inherent in a deep learning model, a product found with a vector sum of the respective attributes in the vector space may be different from a product found with a vector generated by combining character strings. For example, referring to FIG. 5, since a sum of a feature vector representing "Air Max 97" and a feature vector representing "light blue" is different from a feature vector corresponding to "light blue Air Max 97," a user may not retrieve a desired product simply with a sum of vectors.

Further, some deep learning models may require normalization such that a size of a feature vector is constant at all times (e.g., such that the size is 1 at all times). Although it is illustrated that normalization is performed for clarity of description, the normalization is not essential.

In the example embodiment, the multi-modal vector space 400 may be decomposed into a delta space 610 having anisotropy and non-linearity and a VAV space 620 that allows linear expression. Also, the multi-modal vector space 400 may be restored by recombining the decomposed delta space 610 and VAV space 620.

A text encoder f(x) trained through multi-modal learning corresponds to a function that maps given text x to the multi-modal vector space 400.

If mapping attributes of a product to the multi-modal vector space 400 may be linearly expressed, it may be expressed as a sum of the respective attributes, such as [f(Air Max 97 light blue)=f(Air Max 97)+f(light blue)].

However, since vectors handled in deep learning are vectors in a non-linear, high-dimensional multi-modal space, the vectors may not be perfectly expressed through a linear combination of the respective vectors. That is, f(Air Max 97 light blue)≠f(Air Max 97)+f(light blue).

When transforming multi-modal embedding to a random space, linear expression is possible and, in this example embodiment, the random space may be defined as the VAV space 620.

Vectors in the multi-modal vector space 400 may be expressed as vectors in the VAV space 620 in which the linear expression is possible and vectors in the delta space 610 in which the linear expression is not possible.

$$f(x) = e_t = P_{VAVS}(x) + \delta(x, \gamma) \quad \text{[Equation 1]}$$

$P_{VAVS}(x)$=projection of a into VAVS space
$\delta(x,\gamma)$=non-linear components as function of x and γ
γ=variables not controlled by x)
(Here,)

Herein, the VAV space 620 in which delta (δ) may be approximated to constant epsilon (ε) may be defined.

$$\delta(x,y) \approx \delta(y,\gamma) \approx \delta(x+y,\gamma) \approx \epsilon \quad \text{[Equation 2]}$$

Therefore, an embedding vector may be directly linearly approximated and expressed by correcting an error caused due to the epsilon (ε).

$$f(x+v) \approx f(x) + f(v) + f(\gamma) - \epsilon \quad \text{[Equation 3]}$$

Referring again to FIG. 3, in operation S320, the processor 220 may perform a vector operation between attributes according to a user query through the VAV space 620 that allows linear computation between attributes.

When F is a function that maps text X representing a random attribute to the multi-modal vector space 400, embedding of the text X may be expressed as F(X).

If a vector sum in the embedding space is assumed to be valid, a relationship of F(A+B)=F(A)+F(B) needs to be established between two attributes A and B, but the vector sum is not established in a vector space in which non-linearity is inherent [F(A+B)/F(A)+F(B)]. Since the vector sum in the embedding space is not valid, a vector difference is also not established [F(A+B)≠F(A)/F(B)].

The example embodiment may apply a correction function (Δ) for establishing a vector operation in the embedding space.

$$F(A+B) = F(A) + F(B) + \Delta(\theta)$$

$$F(A+B) - F(A) = F(B) + \Delta(\theta) \quad \text{[Equation 4]}$$

Here, if a correct answer of the vector operation to a random attribute is defined as ε, the following equations may be established.

$$\varepsilon_{A+B} = F(A) + F(B) + \Delta(\theta) \quad \text{[Equation 5]}$$

$$\varepsilon_{(A+B)-A} = F(A+B) - F(A) + \Delta(\theta) \quad \text{[Equation 6]}$$

For example, the correction function (Δ) corresponding to specific attributes A and B may be estimated as follows.

$$\Delta(\theta) = F(A+B) - (F(A) + F(B)) \quad \text{[Equation 7]}$$

Here, $\Delta(\theta)$ may be computed from various attribute vector operation values, $\tilde{\Delta}$ that approximates $\Delta(\theta)$ may be acquired using an average value, and the vector operation may be approximated using the same.

$$\varepsilon_{A+B} \approx F(A) + F(B) + \tilde{\Delta} \quad \text{[Equation 8]}$$

$$\varepsilon_{(A+B)-A} \approx F(A+B) - F(A) + \tilde{\Delta} \quad \text{[Equation 9]}$$

The processor 220 may perform the vector operation in the VAV space 620 that allows linear expression. Here, a linear vector operation between attributes may be performed through an approximate computation using the correction function (Δ).

Figure 7:
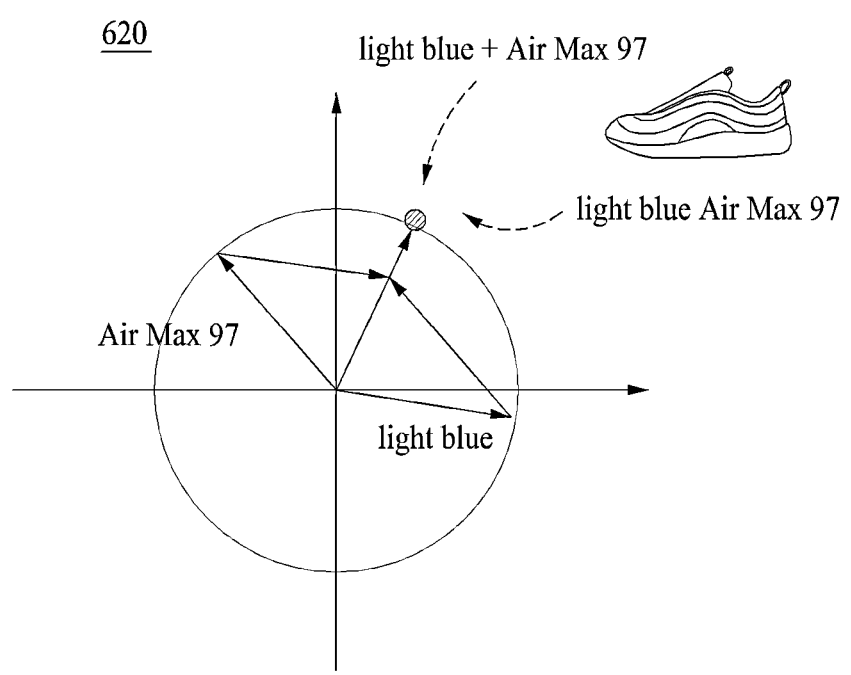
FIG. 7 is a diagram illustrating an example explaining vector operation results through error correction according to at least one example embodiment.

The linear computation is possible due to error correction for the vector operation between attributes. Therefore, for example, as illustrated in FIG. 7, a sum of a feature vector representing "Air Max 97" and a feature vector representing "light blue" may be approximated to a feature vector corresponding to "light blue Air Max 97" through the error correction.

In operation S330, the processor 220 may restore the VAV space 620 for the linear vector operation to the multi-modal vector space 400 and may provide search results corresponding to the user query based on an embedding vector acquired through the vector operation in the VAV space 620. In the VAV space 620 that allows the vector operation, a plurality of attributes may be combined through a vector sum and a specific attribute may be subtracted through a vector difference. The processor 220 may provide, as the search results, at least one product having a vector within a certain distance from an embedding vector acquired through the vector operation in the VAV space 620 among products in the multi-modal vector space 400. Therefore, in the example embodiment, the user may quickly and easily search for a product with a desired attribute using only the vector operation (vector sum and/or vector difference) in the embedding space for various attributes.

Figure 8:
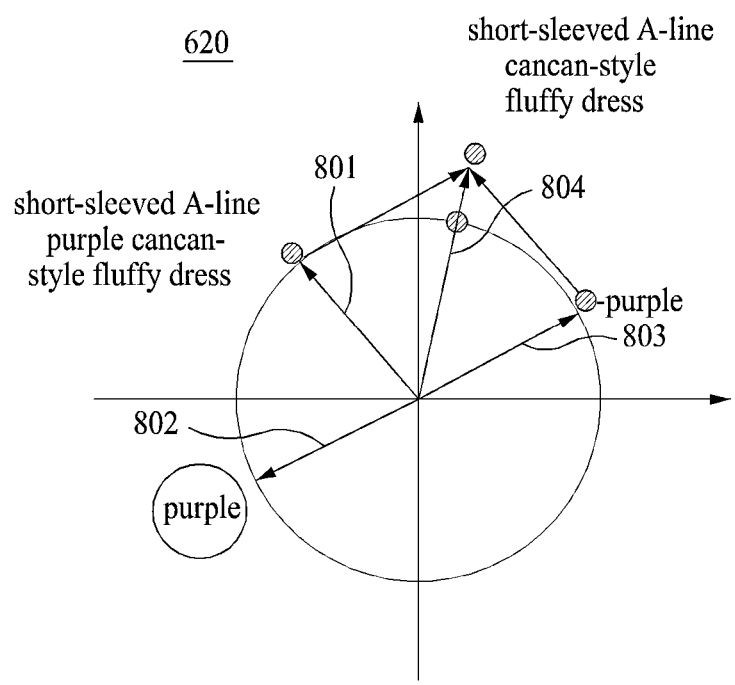
FIG. 8 is a diagram illustrating an example explaining a vector operation of subtracting an attribute according to at least one example embodiment.

FIG. 8 illustrates an example of explaining a vector operation of subtracting an attribute according to at least one example embodiment.

Referring to FIG. 8, in the case of removing specific attribute "purple" from product "short-sleeved A-line purple cancan-style fluffy dress," the processor 220 may acquire a vector 804 corresponding to product "short-sleeved A-line cancan-style fluffy dress" without the attribute "purple" through a vector operation that combines a vector 801 corresponding to the corresponding product in the VAV space 620 and a vector 803 in a direction opposite to that of a vector 802 representing the attribute "purple." The processor 200 may acquire the same effect as if a feature vector manipulation is performed by restoring the VAV space 620 to the multi-modal vector space 400 after the vector operation.

Figure 9:
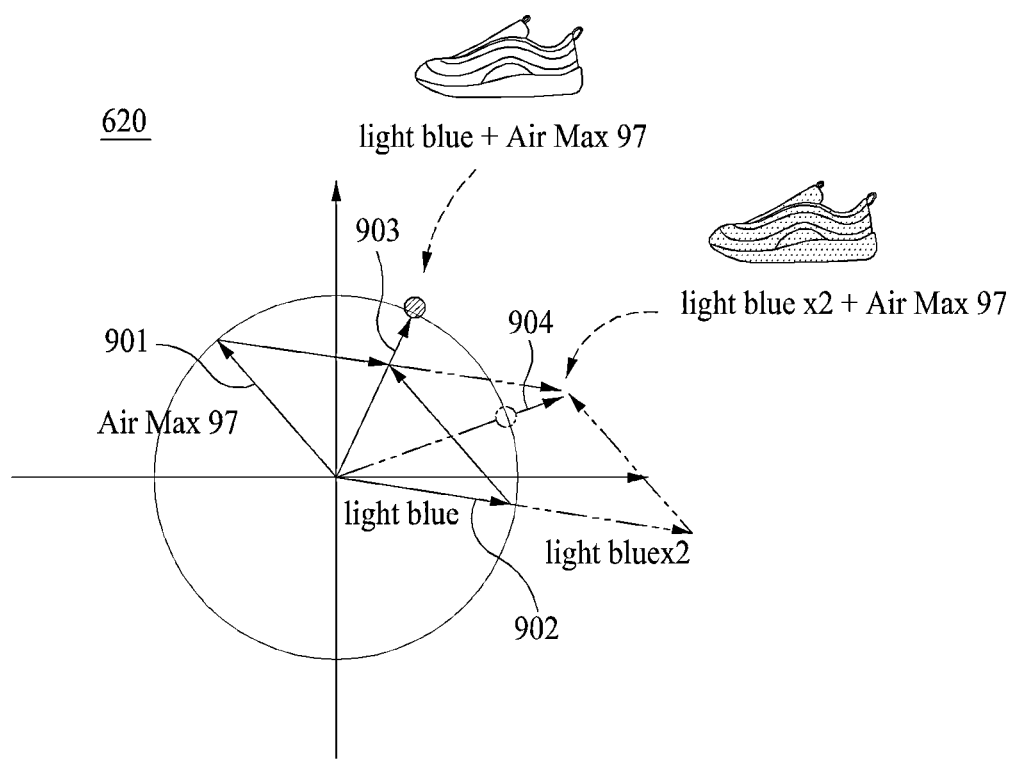
FIG. 9 is a diagram illustrating an example explaining a vector operation of adjusting strength of an attribute according to at least one example embodiment.

FIG. 9 illustrates an example of explaining a vector operation of adjusting the strength of an attribute according to at least one example embodiment.

A single vector may be decomposed into a plurality of components. For example, the strength of a specific attribute may be adjusted using scalar multiplication. That is, a vector operation that multiplies a vector of the specific attribute by a number may also be performed.

Referring to FIG. 9, the processor 220 may acquire a vector 903 corresponding to "light blue Air Max 97" through a combination of a vector 901 representing attribute "Air Max 97" and a vector 902 representing attribute "light blue" in the VAV space 620. When a user's intent to search for darker light blue than "light blue Air Max 97" is recognized, the processor 200 may acquire a vector 904 corresponding to "light blue×2 Air Max 97" with the adjusted strength of the attribute "light blue" through the scalar multiplication of the vector 902 representing the attribute "light blue" in the VAV space 620.

Figure 10:
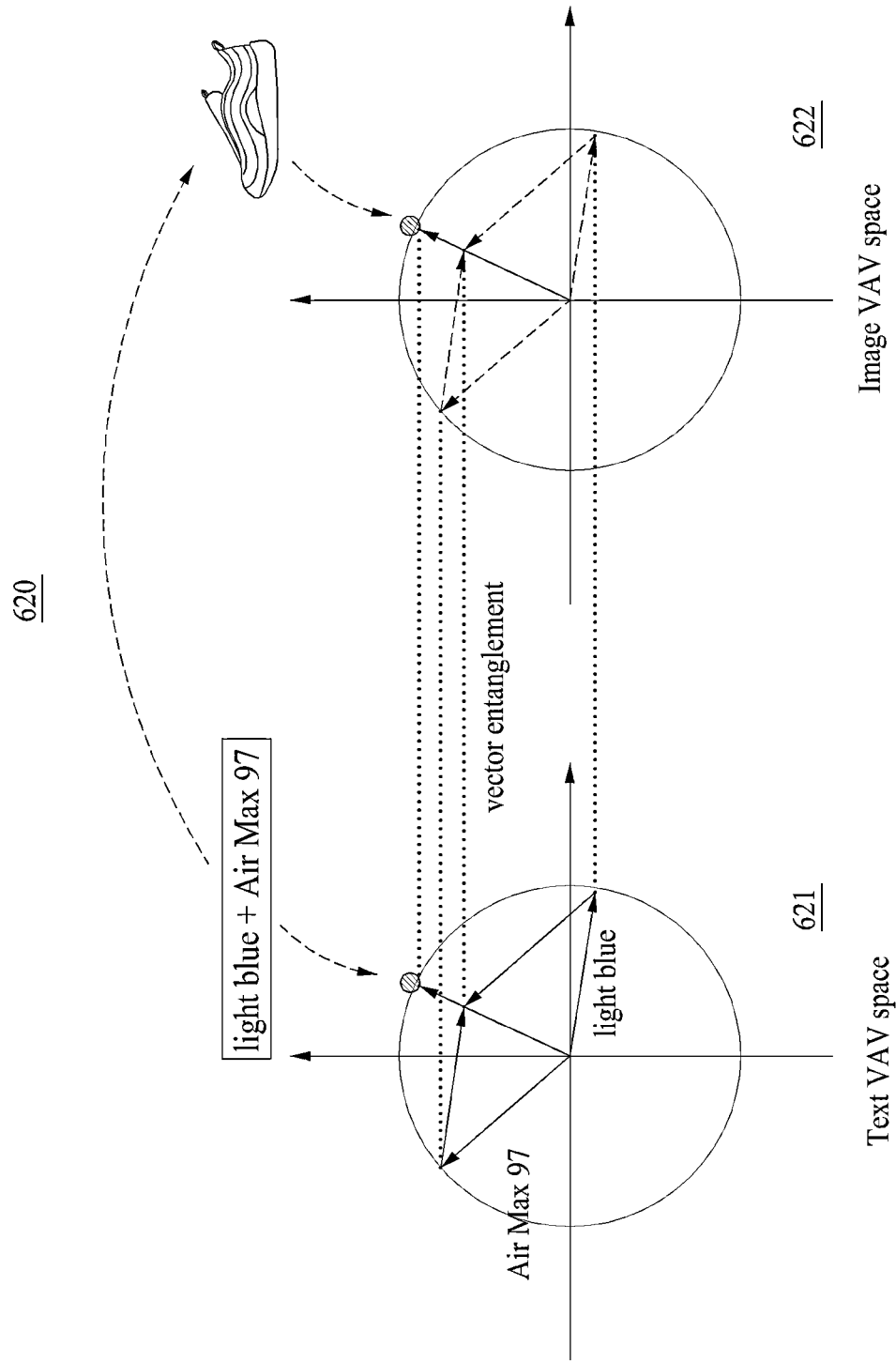
FIGS. 10 and 11 are diagrams illustrating examples explaining a vector entanglement-based vector operation according to at least one example embodiment.
Figure 11:
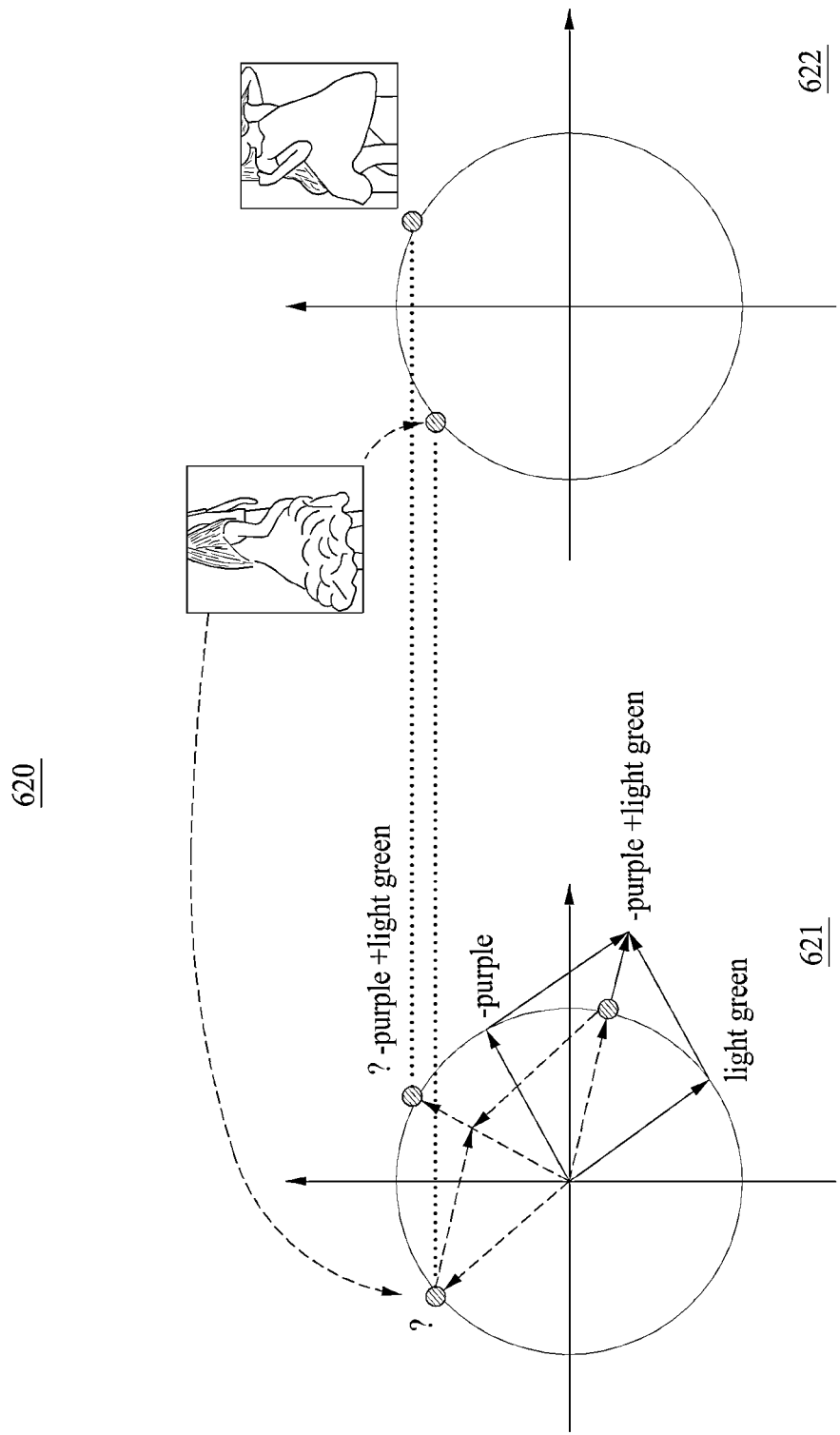

FIGS. 10 and 11 illustrate examples of explaining a vector entanglement-based vector operation according to at least one example embodiment.

As described above with reference to FIG. 4, the multi-modal vector space 400 may be decomposed into the text vector space 410 and the image vector space 420. Likewise, as illustrated in FIG. 10, the VAV space 620 may be decomposed into a text VAV space 621 and an image VAV space 622. Since the text VAV space 621 and the image VAV space 622 use the same coordinate spatial system, a cross-modal feature vector manipulation may be performed. A text vector corresponding to "light blue Air Max 97" in the text VAV space 621 and an image vector corresponding to "light blue Air Max 97" in the image VAV space 622 may have the same coordinates.

Referring to FIG. 11, the processor 220 may change an attribute between the text VAV space 621 and the image VAV space 622 through the cross-modal feature vector manipulation. For example, the processor 220 may change an image attribute by manipulating a text vector matched to the text VAV space 621 for a specific image vector in the image VAV space 622. For example, when a user's intent to search for a product including attribute "light green" instead of attribute "purple" in product "short-sleeved A-line purple cancan-style fluffy dress" is recognized, the processor 200 may retrieve a text vector corresponding to "short-sleeved A-line light green cancan-style fluffy dress" through a vector operation between attributes in the text VAV space 621 and may retrieve matched image vector "short-sleeved A-line light green cancan-style fluffy dress" in the image VAV space 622.

In this manner, a correct answer may be found in the multi-modal vector space 400 by defining multi-modal embedding of a product as a virtual attribute vector in the VAV space 620 and a vector with anisotropy and non-linearity in the delta space 610. Since a linear vector operation is possible through the VAV space 620, it is possible to quickly conduct a search and to easily and consistently respond to a change in a model. Here, by defining an objective function such that a size of delta (δ) decreases, a high-performance and more robust model may be generated.

The processor 220 may search for a product desired by a user by using natural language expression as a query. Here, the processor 220 may provide a search through an attribute transformation by adding or excluding a specific attribute using text.

Figure 12:
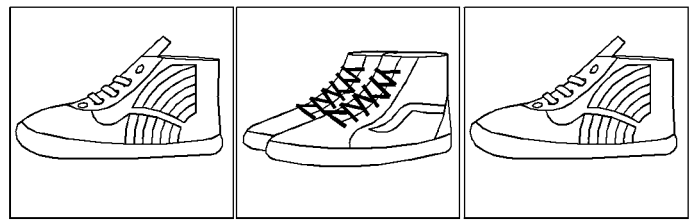
FIG. 12 is a diagram illustrating an example of a text-based query combination according to at least one example embodiment.
Figure 12:
Figure 12:
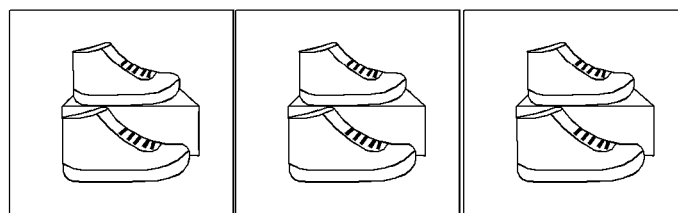
Figure 12:
Figure 12:
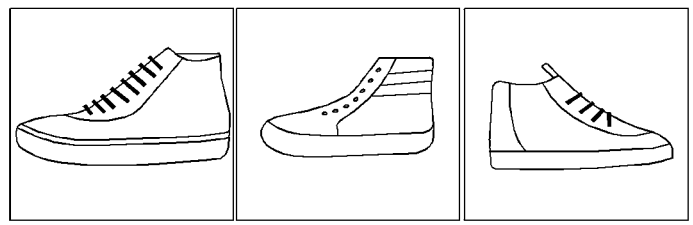

For example, as illustrated in FIG. 12, the processor 220 may retrieve a product with a user-desired attribute through an operation of adding or subtracting a specific attribute, such as a product corresponding to query "rainbow old school high tops," a product corresponding to a query in which attribute "rainbow" is subtracted from the query "rainbow old school high tops," a product corresponding to a query in which the attribute "rainbow" is subtracted from and attribute "red" is added to the query "rainbow old school high tops."

Also, the processor 220 may support voice input for a natural language query and, here, may provide a search through an attribute transformation, such as modification of a keyword in a natural language search based on voice input. For example, the user may give a natural language command including an operation on a desired attribute, such as "Find me sneakers with white Mickey on them or, 'Donald' instead of 'Mickey,'" or a command excluding a specific attribute while giving a specific command, such as "Recommend what coat to wear. Not the red one."

Processing of voice input may be implemented by recognizing voice input and performing the same natural language processing as a text search (e.g., transforming the voice input to text and applying the same to a shopping search model) or by embedding a voice signal itself to a multi-modal space (e.g., learning <voice, product name text, product image> pair and embedding the same to the multi-modal space).

Also, the processor 220 may search for a user-desired product by using a multi-modal input including an image and text as a query and, here, may provide a search through a mutual operation between the image and the text entered as the query.

Figure 13:
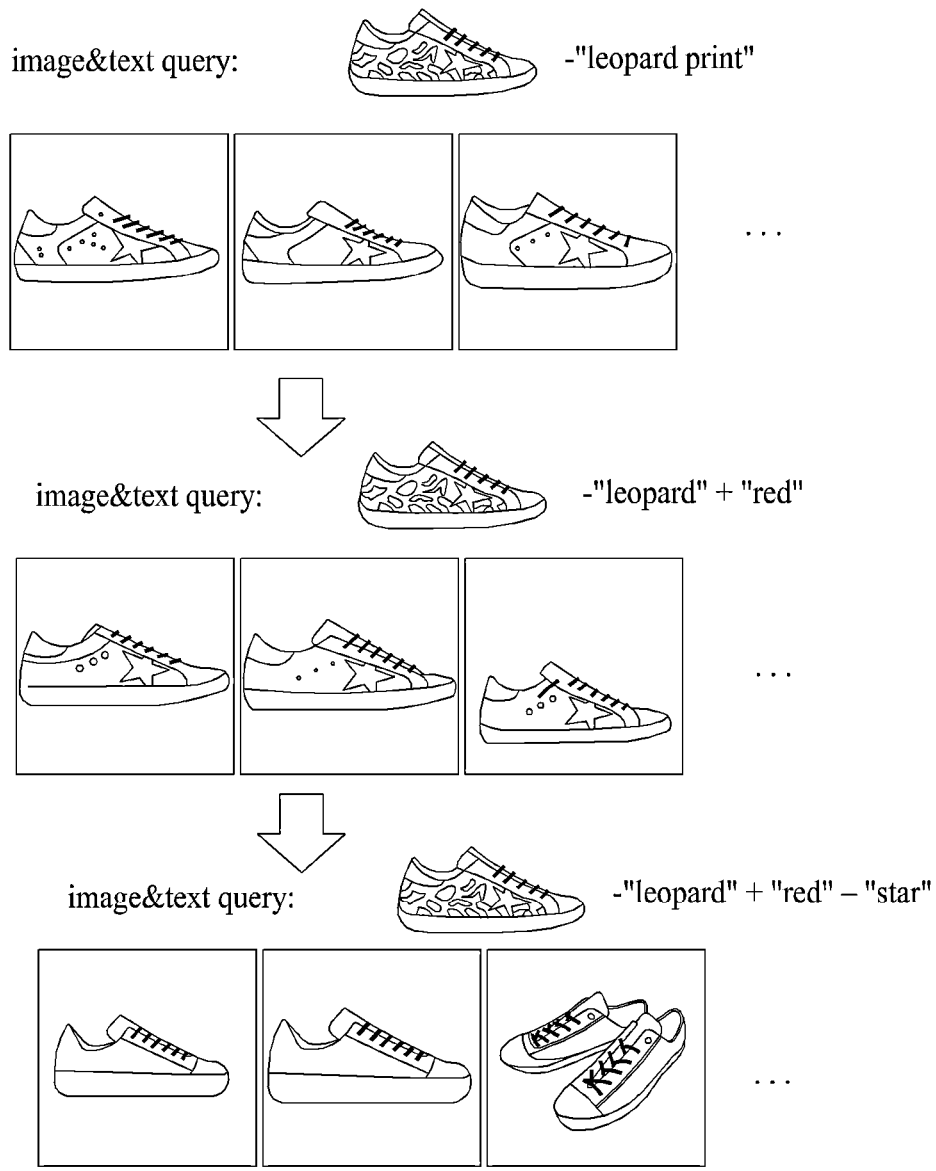
FIG. 13 illustrates an example of a query combination of an image and a text according to at least one example embodiment.

For example, referring to FIG. 13, when text "leopard print" including a subtraction operator is input with a specific image as a query, a product in which the attribute "leopard print" is subtracted may be found based on a feature acquired through a vector operation between a corresponding image feature and the attribute "leopard print." When the text "leopard print" including the subtraction operator and the text "red" including an add operator are input with a specific image as a query, a product in which the attribute "leopard print" is subtracted and the attribute "red" is added based on a feature acquired through a vector operation between the corresponding image feature and the attribute "leopard print" and the attribute "red." When the text "leopard print" including the subtraction operator, the text "red" including the add operator, and text "star" including the subtraction operator are input with a specific image as a query, a product in which the attributes "leopard print" and "star" are subtracted and the attribute "red" is added may be found based on a feature acquired through a vector operation between the corresponding image feature and the attributes "leopard print," "red," and "star."

Figure 14:
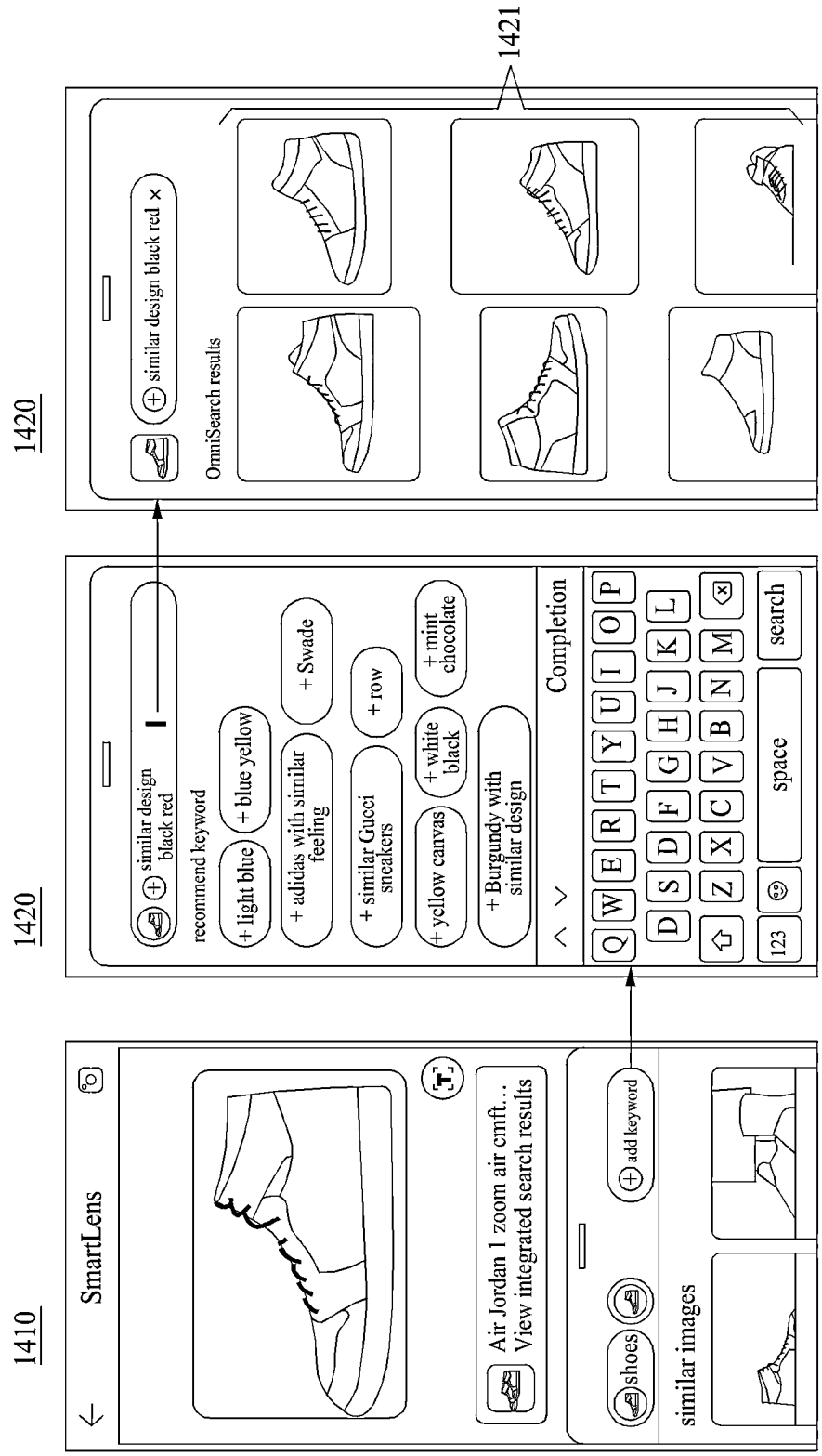
FIGS. 14 and 15 illustrate examples of a search screen according to at least one example embodiment.
Figure 15:
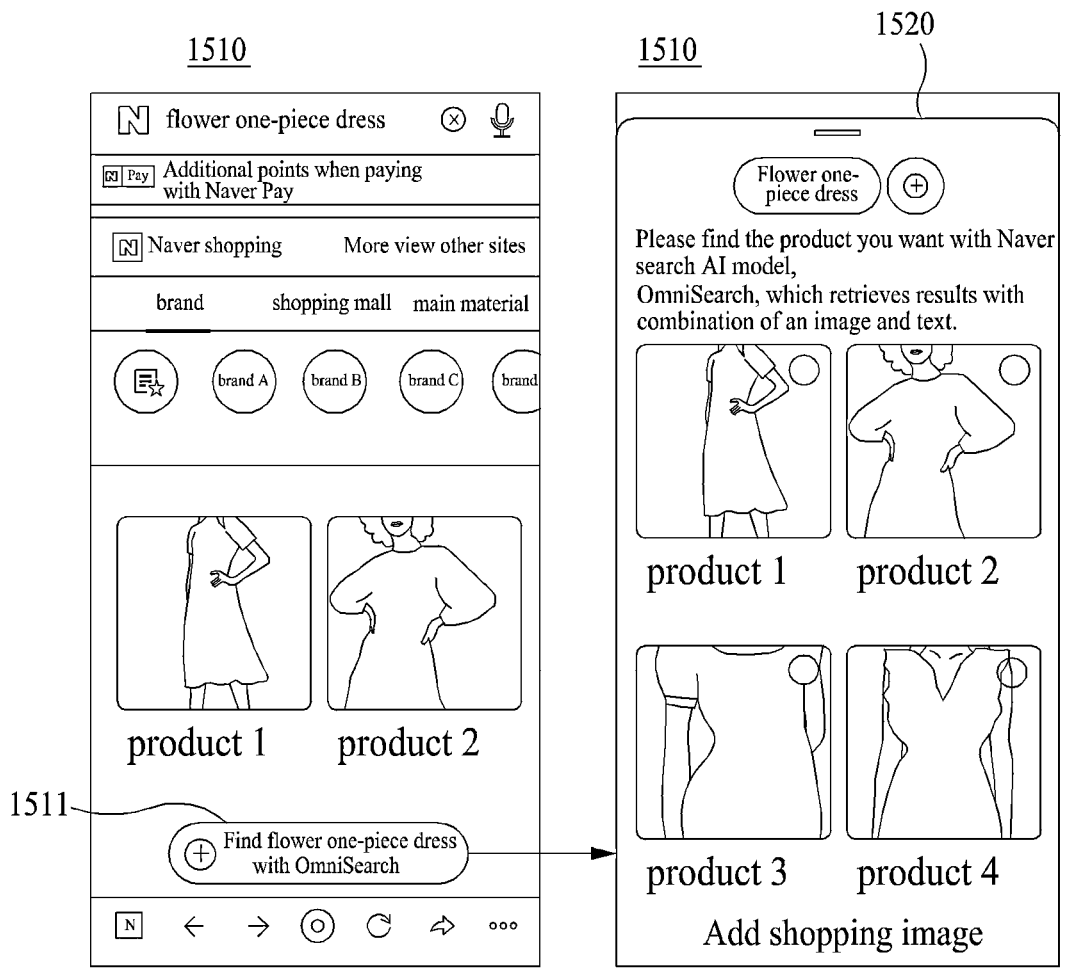

FIGS. 14 and 15 illustrate examples of a search screen according to at least one example embodiment.

The example embodiment may select an image to apply as a query and then add a text keyword to search for a product through a query combination.

For example, FIG. 14 illustrates an image search screen 1410 on an electronic device, e.g., any of the electronic devices 110, 120, 130, 140, for providing search results for a query in a form of an image. The image search screen 1410 may include a multi-modal search layer 1420 for adding a keyword. In the case of adding a keyword on the image search screen 1410, the multi-modal search layer 1420 may slide up and be displayed on the electronic device. In response to a keyword input to the multi-modal search layer 1420 by a user, a product of a user-desired attribute may be provided as search results 1421 through a combination with an image input to the image search screen 1410. The input image may be received through a camera or retrieved from saved images. Images that are input to the image search screen 140 may be read in various other ways. For example, to use an image as a query for information search in an image search screen 1410, such as "Naver Smart Lens," the camera is run and the image is input through the camera.

The example embodiment may search for a product through a query combination by selecting an image from search results for a text query or by additionally inputting a text keyword.

For example, FIG. 15 illustrates an integrated search screen 1510 on an electronic device, e.g., any of the electronic devices 110, 120, 130, 140, for providing search results for a text-based query. A floating button 1511 for entry into an additional search may be displayed on the integrated search screen 1510. Here, the floating button 1511 may be displayed at an appropriate location at an appropriate point in time in consideration of user experience. For example, the floating button 1511 may be displayed on the integrated search screen 1510 during a period from a point in time at which a top region of a specific collection (e.g., shopping collection) among the search results included in the integrated search screen 1510 is displayed on a screen to a point in time at which a bottom region of the corresponding collection is displayed on the screen. Also, the floating button 1511 may be displayed at a specific location of the screen after securing a region for displaying a specific region (e.g., title, more view region, additional region, etc.).

In response to a touch on the floating button 1511 on the integrated search screen 1510 by a user, the multi-modal search layer 1520 may slide up and be displayed on the electronic device. The multi-modal search layer 1520 may include an interface for selecting at least one image among images included in the search results as an additional query and an interface for additionally inputting a text-based keyword. In response to a selection by the user on a specific image from the search results included in the multi-modal search layer 1520 or an input of an additional text keyword by the user, a product with a user-desired attribute may be provided as additional search results through combination with an initial keyword input through the integrated search screen 1510 by the user.

According to some example embodiments, since it is possible to retrieve a product more suitable for user intent by simultaneously understanding a multi-modal input in which an image and text are combined, it is possible to improve search quality. In particular, according to some example embodiments, it is possible to more quickly and easily search for desired search results through a vector operation by transforming multi-modal embedding of a product to a vector space that allows linear expression. Also, according to some example embodiments, it is possible to accurately reflect user intent by providing various combinations of searches of readily adding or subtracting an attribute using a virtual space that allows a vector operation.

The apparatuses, devices and servers described herein may be implemented using hardware components, software components, and/or a combination thereof. For example, the apparatuses, devices and the servers and the components described herein may be implemented using one or more processing devices, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of non-transitory computer-readable media include magnetic media such as hard disks, floppy disks, and magnetic tapes; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-modal search method for searching a product on a computer network performed by a computer device, wherein the computer device comprises at least one processor configured to execute computer-readable instructions included in a memory, the method comprising:
   receiving a user query from a user for a product including a plurality of attributes of the product;
   mapping the plurality of attributes of the product to a multi-modal embedding space;
   decomposing the multi-modal embedding space into a delta space including non-linear information and a virtual attribute vector space supporting linear vector expression;
   performing a vector operation between at least two attribute vectors associated with the plurality of attributes included in the user query in the virtual attribute vector space;
   restoring the multi-modal embedding space by combining the delta space and the virtual attribute vector space, the restored multi-modal embedding space including an embedding vector acquired through the vector operation performed in the virtual attribute vector space; and
   providing search results of the product in the user query based on the embedding vector in the restored in the multi-modal embedding space;
   wherein the performing of the vector operation further comprises:
      estimating a correction function that considers a non-linear error associated with the non-linear information using each attribute vector in the multi-modal embedding space; and
      performing the vector operation between the attribute vectors associated with the attributes by adding or subtracting the correction function.

2. The multi-modal search method of claim 1, wherein the performing of the vector operation comprises performing a vector operation corresponding to at least one image and at least one text input as the user query.

3. The multi-modal search method of claim 1, wherein the performing of the vector operation comprises subtracting a specific attribute through a combination with a vector in a direction opposite to that of a vector corresponding to the specific attribute among attributes included in the user query.

4. The multi-modal search method of claim 1, wherein the performing of the vector operation comprises adjusting a strength of a specific attribute through scalar multiplication of a vector corresponding to the specific attribute among attributes included in the user query.

5. The multi-modal search method of claim 1, wherein the performing of the vector operation comprises performing a cross-modal feature vector manipulation between a text vector space and an image vector space using the same coordinate system.

6. A non-transitory computer-readable recording medium storing instructions that, when executed by a processor, cause the processor to computer-implement the multi-modal search method of claim 1.

7. A computer device comprising:
   at least one processor configured to execute computer-readable instructions included in a memory,
   wherein the at least one processor is configured to process:
      receiving a user query from a user for a product including a plurality of attributes of the product;
      mapping the plurality of attributes of the product to a multi-modal embedding space;
      decomposing the multi-modal embedding space into a delta space including non-linear information and a virtual attribute vector space supporting linear vector expression;
      performing a vector operation between at least two attribute vectors associated with the plurality of attributes included in the user query in the virtual attribute vector space;
      restoring the multi-modal embedding space by combining the delta space and the virtual attribute vector space, the restored multi-modal embedding space including an embedding vector acquired through the vector operation performed in the virtual attribute vector space; and providing search results of the product in the user query based on the embedding vector in the restored in the multi-modal embedding space;

wherein the performing of the vector operation further comprises:

estimating a correction function that considers a non-linear error associated with the non-linear information using each attribute vector in the multi-modal embedding space; and performing the vector operation between the attribute vectors associated with the attributes by adding or subtracting the correction function.

8. The computer device of claim 7, wherein the at least one processor is configured to perform a vector operation corresponding to at least one image and at least one text input as the user query.

9. The computer device of claim 7, wherein the at least one processor is configured to perform a vector operation of subtracting a specific attribute through a combination with a vector in a direction opposite to that of a vector corresponding to the specific attribute among attributes included in the user query.

10. The computer device of claim 7, wherein the at least one processor is configured to perform a vector operation of adjusting a strength of a specific attribute through scalar multiplication of a vector corresponding to the specific attribute among attributes included in the user query.

* * * * *